Dec. 29, 1925.
V. A. JAMES
1,567,952
PISTON RING
Original Filed Nov. 16, 1920    2 Sheets-Sheet 1
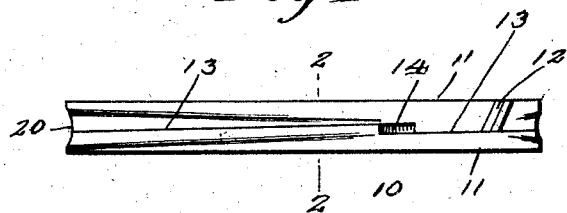
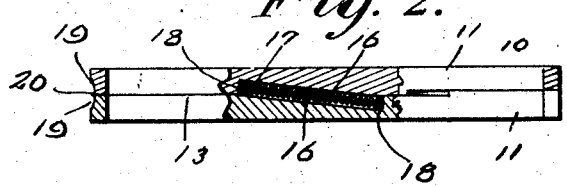
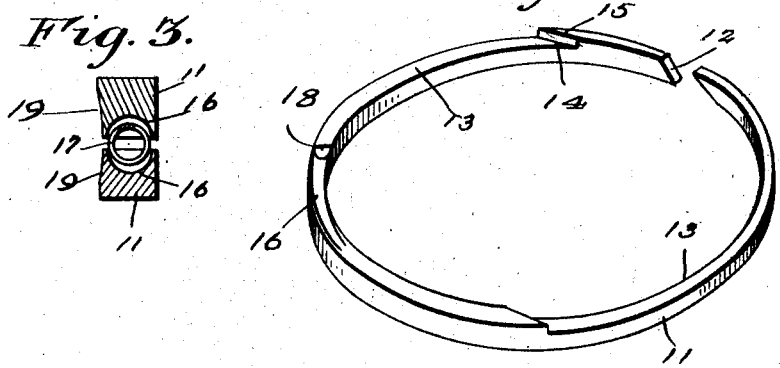

Dec. 29, 1925.

V. A. JAMES 1,567,952

PISTON RING

Original Filed Nov. 16, 1920  2 Sheets-Sheet 2

Patented Dec. 29, 1925.

1,567,952

UNITED STATES PATENT OFFICE.

VICTOR A. JAMES, OF TAMPA, FLORIDA.

PISTON RING.

Application filed November 16, 1920, Serial No. 424,402. Renewed June 6, 1922. Serial No. 566,265.

*To all whom it may concern:*

Be it known that I, VICTOR A. JAMES, a citizen of the Dominion of Canada, residing at Tampa, in the county of Hillsborough and State of Florida, have invented new and useful Improvements in Piston Rings, of which the following is a specification.

This invention relates to improvements in packing rings especially designed for use upon engine pistons.

An object of the invention is the provision of a ring which will be adjusted to occupy the entire width of the piston groove, so as to prevent waste of oil, the ring being formed in sections which may be either separately or simultaneously ground within their grooves and adjusted to a perfect fit.

Another object is the provision of a packing ring having a circumferential oil groove which carries a proper amount of lubricant, but prevents the lubricant from passing behind the ring into the piston groove.

With the above and other objects in view, the invention further includes the following novel features and details of construction, to be hereinafter more fully described, illustrated in the accompanying drawings and pointed out in the appended claims.

In the drawings:—

Figure 1 is a side elevation of a packing ring embodying the invention.

Figure 2 is a tranverse sectional view of the same, the ring being partly broken away to show the manner of mounting an expansible spring for increasing the width of the ring.

Figure 3 is an enlarged transverse section taken through the spring and the ring sections and showing the manner of housing the spring.

Figure 4 is a detail perspective view of one of the rings or sections which go to make up a complete ring.

Figure 5:
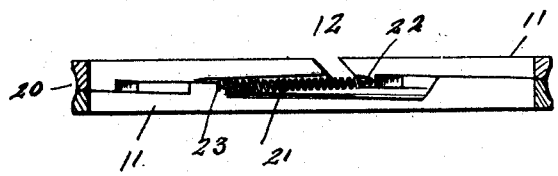
Figure 5 is a view similar to Figure 2 but showing a different manner of securing the spring.

Referring to the drawings in detail, wherein like characters of reference denote corresponding parts, the reference character 10 indicates the completed ring which is formed of a plurality of separate rings or sections 11. These rings 11 are split as shown at 12 so that the adjacent ends will overlap when the rings are compressed as is usual in rings of this character.

Figure 7:
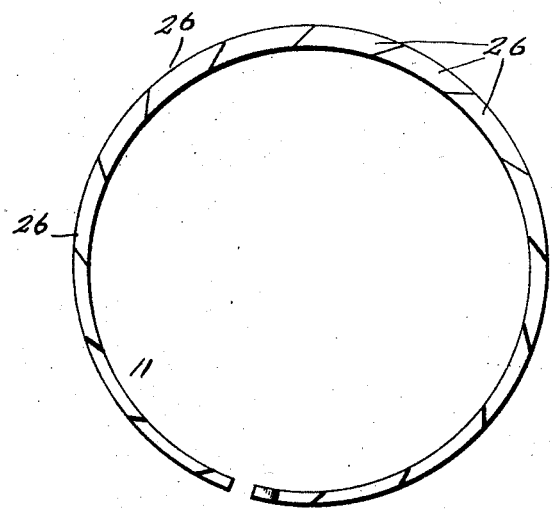
Figure 7 is a plan view of one of the ring sections having a number of relatively short inclined expanding surfaces.

The opposed edges of each of the rings 11 are provided with inclined expanding surfaces 13, the adjacent ends of these surfaces being separated by a shoulder 14 which is tangentially beveled as shown at 15. Any number of these expanding surfaces 13 may be provided, for example the ring illustrated in Figure 4 having two of such surfaces, while the ring illustrated in Figure 7 is provided with an increased number, the latter surfaces however being relatively short.

Each of the ring sections 11 is also provided upon their opposed edges with grooves 16 which form a seat for an expansible spring 17, the ends of the latter bearing against shoulders 18 provided at one end of each of the grooves 16, the tendency of this spring being to force the rings 11 in opposite rotary directions so as to cause the inclined expanding surfaces 13 to ride upon one another and increase the combined width of the rings. The rings 11 may be either separately or simultaneously ground within the piston grooves and a perfect fit thus assured, as the spring 17 will cause expansion and hold the rings properly adjusted. As the rings 12 gradually decrease in width toward the split 12 and these splits are differently positioned, the tangentially beveled shoulders 15 will also cause a radial expansion of the ring.

The ring sections 11 have their outer surfaces beveled inwardly as at 19 toward the opposed edges of the rings, so that when the ring sections are assembled there will be provided a groove 20 to receive and hold the lubricant, the bevels 19 however, terminating short of the split ends 12 of the ring.

Various changes may be made in the invention, for example in Figure 5 a retractile spring 21 is employed, one end of this spring being secured to one of the ring sections 11 as shown at 22 and its opposite end secured to the other ring section as shown at 23. This has a tendency to impart a rotary movement to the ring sections in opposite directions and to increase their combined width, as will be readily understood.

Figure 6:
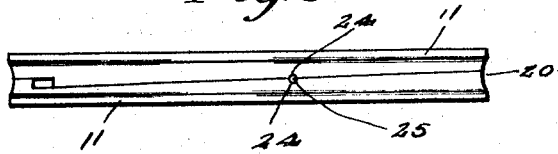
Figure 6 is an elevation showing means for positively holding the ring sections against relative rotary movement.

In Figure 6 the spring is dispensed with and the opposed edges of the ring sections are provided with notches 24, so that after the ring is adjusted to the piston, a pin 25 may be inserted through an opening formed by the registering notches of the ring sections and the ring thus securely held in proper expansible position.

In Figure 7, the structure is the same as that shown in Figures 1 to 4, except that the inclined expanding surfaces are increased in number and are of relatively short length, as indicated at 26.

The invention is susceptible of various other changes in its form, proportions and minor details of construction and the right is herein reserved to make such changes as properly fall within the scope of the claims.

Having described the invention what is claimed is:—

1. A piston ring formed of a plurality of superimposed split rings having their opposed edges formed with a number of inclined surfaces, the inclined surface of one ring being disposed opposite to that of the other ring, whereby relative rotary movement of the rings will increase their combined width and a spring located between the rings for forcing the latter to move in opposite rotary directions.

2. A piston ring comprising a plurality of ring sections having lengthwise-tapered oppositely disposed lateral meeting faces, and a spring interposed between the sections to exert rotatable pressure thereon in opposite directions to increase their combined width.

3. A piston ring comprising a pair of split ring sections having lengthwise-tapered contacting surfaces so relatively disposed that rotation of one ring section against the taper of the adjacent ring section tends to increase their combined width, each of said ring sections provided with a shoulder intersecting its tapered face, and a spring interposed between said ring sections to engage at opposite ends said shoulders to exert pressure on said ring sections in opposite directions to increase their combined width.

In testimony whereof I affix my signature.

VICTOR A. JAMES.